United States Patent [19]

Chang et al.

[11] Patent Number: 5,393,609
[45] Date of Patent: Feb. 28, 1995

[54] WEATHERABLE POWDER COATINGS

[75] Inventors: Yeong-Ho Chang; Robert B. Barbee, both of Kingsport, Tenn.

[73] Assignee: Eastman Chemical Company, Kingsport, Tenn.

[21] Appl. No.: 258,895

[22] Filed: Jun. 13, 1994

[51] Int. Cl.⁶ .................. B32B 19/00; C08F 20/00
[52] U.S. Cl. .................. 428/357; 528/272; 528/296; 528/307; 525/437; 525/440; 525/444; 525/934; 428/482
[58] Field of Search .......... 528/272, 296, 307; 525/437, 440, 444, 934; 428/357, 482

[56] References Cited

U.S. PATENT DOCUMENTS

| | | | |
|---|---|---|---|
| 3,313,777 | 4/1967 | Elam et al. | 528/195 |
| 4,363,908 | 12/1982 | Joyner et al. | 528/302 |
| 4,525,504 | 6/1985 | Morris et al. | 524/99 |
| 4,859,760 | 8/1989 | Light, Jr. et al. | 528/45 |
| 4,910,292 | 3/1990 | Blount | 528/272 |
| 5,097,006 | 3/1992 | Kapilow et al. | 528/272 |
| 5,256,761 | 10/1993 | Blount, Jr. | 528/272 |

*Primary Examiner*—Samuel A. Acquah
*Attorney, Agent, or Firm*—Bernard J. Graves, Jr.; Harry J. Gwinnell

[57] ABSTRACT

This invention provides weatherable thermosetting powder coating compositions based on 1,2-cyclohexanedicarboxylic acid and 2,2,4,4-tetramethyl-1,3-cyclobutanediol. Coatings from this invention exhibit far superior QUV (313 bulb) resistance than compositions based on resins prepared from 1,3-and 1,4-cyclohexanedicarboxylic acid and are 20 times better than standard aromatic resin using the same cross-linking chemistry.

21 Claims, No Drawings

WEATHERABLE POWDER COATINGS

FIELD OF THE INVENTION

This invention belongs to the field of thermosetting powder coating compositions. In particular, this invention relates to resins comprised of 1,2-cyclohexanedicarboxylic acid and 2,2,4,4-tetramethyl-1,3-cyclobutanediol. The powder coatings prepared from these resin exhibit surprisingly better QUV resistance than comparable systems based on 1,3- or 1,4-cyclohexanedicarboxylic acid.

BACKGROUND OF THE INVENTION

Plastic materials used in the manufacture of powder coatings are classified broadly as either thermosetting or thermoplastic. In the application of thermoplastic powder coatings, heat is applied to the coating on the substrate to melt the particles of the powder coating and thereby permit the particles to flow together and form a smooth coating.

Thermosetting coatings, when compared to coatings derived from thermoplastic compositions, generally are tougher, more resistant to solvents and detergents, have better adhesion to metal substrates and do not soften when exposed to elevated temperatures. However, the curing of thermosetting coatings has created problems in obtaining coatings which have, in addition to the above-stated desirable characteristics, good smoothness and flexibility. Coatings prepared from thermosetting powder compositions, upon the application of heat, may cure or set prior to forming a smooth coating, resulting in a relatively rough finish referred to as an "orange peel" surface. The "orange peel" surface problem has caused thermosetting coatings to be applied from organic solvent systems which are inherently undesirable because of the environmental and safety problems that may be occasioned by the evaporation of the solvent system. Solvent-based coating compositions also suffer from the disadvantage of relatively poor percent utilization, i.e., in some modes of application, only 60 percent or less of the solvent-based coating composition being applied contacts the article or substrate being coated. Thus, a substantial portion of solvent-based coatings can be wasted since that portion which does not contact the article or substrate being coated obviously cannot be reclaimed.

Powder coatings that exhibit good weatherability are becoming increasingly important, particularly for outdoor applications. Commercial polyester resins for powder coatings are mostly based on terephthalic acid and isophthalic acid as diacids and neopentyl glycol as the diol with minor variations. Powder coatings based on these aromatic polyester resins provide good general properties but only fair weathering resistance.

Powder coatings based on acrylic resins are known to have excellent weathering performance but are generally more expensive.

British Patent No. 962,913 discloses polyesters containing cyclohexanedicarboxylic acid and 2,2,4,4-tetramethyl-1,3-cyclobutanediol residues useful as film and molding plastics.

U.S. Pat. No. 3,313,777 discloses polyesters containing cyclohexanedicarboxylic acid and 2,2,4,4-tetramethyl-1,3-cyclobutanediol residues useful as film and molding plastics.

U.S. Pat. No. 4,363,908 discloses copolyesters containing cyclohexanedicarboxylic acids and 2,2,4,4-tetramethyl-1,3-cyclobutanediol useful as bonding or coating compositions.

U.S. Pat. No. 4,525,504 discloses stabilized polyesters with improved weatherability based on 1,4cyclohexanedicarboxylic acid and 2,2,4,4-tetramethyl-1,3-cyclobutanediol. These polyesters are high molecular weight polyesters useful in molding plastics.

U.S. Pat. No. 4,910,292 discloses water-dissipatable polyesters useful in coatings. 2,2,4,4-Tetramethyl-1,3-cyclobutanediol and the cyclohexanedicarboxylic acids are listed as possible residues.

U.S. Pat. No. 5,097,006 discloses all aliphatic polyester resins based on 1,4-cyclohexanedicarboxylic acid and hydrogenated bisphenol A and other cycloaliphatic diols, useful as powder coating resins.

SUMMARY OF THE INVENTION

The present invention provides highly weatherable thermosetting powder coating compositions based on a polyester comprised of 1,2-cyclohexanedicarboxylic acid and 2,2,4,4-tetramethyl-1,3-cyclobutanediol. The compositions are useful as coatings especially in applications where the protected article is exposed to extreme sunlight.

DETAILED DESCRIPTION OF THE INVENTION

The present invention provides a thermosetting powder coating composition which comprises,
(a) a polyester comprised of from about 80 to 100 weight percent of residues of 1,2-cyclohexanedicarboxylic acid and from about 80 to 100 weight percent of residues of 2,2,4,4-tetramethyl-1,3-cyclobutanediol, and having a number average molecular weight of about 1500 to 10,000, and a glass transition temperature of about 45° C. to 100° C.; and
(b) a cross-linking agent reactive with said polyester.

In a preferred embodiment of this invention, the polyester has a carboxyl number of from about 20 to about 100, and a hydroxyl number of less than about 15. Such polyesters will be referred to herein as simply "carboxyl polyesters".

In a further preferred embodiment of the present invention, the polyester has a hydroxyl number of from about 20 to about 100, and a carboxyl number of less than about 15. Such polyesters will be referred to herein as "hydroxyl polyesters".

In a further preferred embodiment of the present invention, the polyester will consist essentially of residues of 1,2-cyclohexanedicarboxylic acid, 2,2,4,4-tetramethyl-1,3-cyclobutanediol, and up to 10 weight percent of residues of a triol or tri-acid selected from the group consisting of trimethylolethane, trimethylolpropane, glycerol, and trimellitic anhydride. Trimethylolpropane and trimellitic anhydride are the most highly preferred trifunctional compounds.

As a further aspect of the present invention, there is provided the novel polyesters of the compositions of the present invention. The preparation of a carboxyl polyester or a hydroxyl polyester, i.e., a polyester having predominately carboxyl or hydroxyl functionality can be done using standard polyester polycondensation techniques well-known to one of ordinary skill in the art of polyester chemistry.

The resins of this invention are preferably based on 1,2-cyclohexanedicarboxylic acid (1,2-CHDA) and 2,2,4,4-tetramethyl-1,3-cyclobutanediol. The resin may be modified by up to about 20 weight percent with other diols, such as ethylene glycol, propylene glycol, 1,3-propanediol, 2,4-dimethyl-2-ethylhexane-1,3-diol, 2,2-dimethyl-1,3-propanediol, 2-ethyl-2-butyl-1,3-propanediol, 2-ethyl-2-isobutyl-1,3-propanediol, 1,3-butanediol, 1,4-butanediol, 1,5-pentanediol, 1,6-hexanediol, thiodiethanol, 1,2-, 1,3- and 1,4-cyclohexanedimethanol, 1,4-xylylenediol and the like, and other dicarboxylic acids such as succinic, glutaric, adipic, azelaic, sebacic, fumaric, maleic, itaconic, 1,3- and 1,4-cyclohexanedicarboxylic, phthalic, isophthalic and terephthalic acids.

We have found that these polyesters meet the basic glass transition temperature (Tg) requirement of powder coatings and, unexpectly found that they provide powder coatings with better weatherability than comparable resins based primarily on 1,4-CHDA or 1,3-CHDA. The polyester resin of the present invention has a number average molecular weight (Mn) of from about 1,500 to about 10,000, preferably from about 2,000 to 6,000 and a glass transition temperature (Tg) of about 45° C. to 100° C., preferably 50° to 70° C. and a hydroxyl or a carboxyl number of from about 20 to 100, preferably from about 30 to about 80, for cross-linking.

One powder coating of this invention is comprised of (a) a carboxyl polyester resin described above, (b) a weatherable epoxy crosslinker such as triglycidylisocyanurate (TGIC) commercially available as ARALDITEPT PT810 by Ciba Geigy or an activated β-hydroxylalkyl amide such as Bis(N,N-dihydroxyethyl)adipamide commercially available from Rohm and Haas as PRIMID XL552, and (c) optionally, additives such as benzoin, flow aids, pigments and catalyst. Additives commonly used are benzoin for reducing entrapped air or volatiles, flow aid such as MODAFLOW III, catalyst such as dibutyltin dilaurate and pigments such as titanium dioxide.

Powder coating compositions of this invention may also be of different cross-linking chemistries utilizing, for example, in the case of a hydroxyl polyester, the free hydroxyl functional group of the polyester and crosslinkers typically used in such systems—for example, (1) a polyurethane system made from a hydroxyl polyester and a polyisocyanate, and (2) a glycoluril system from a hyroxyl polyester and a glycoluril cross-linker such as tetramethoxymethyl glycoluril.

The blocked polyisocyanate cross-linkers referred to above are those well known in the art of powder coatings. Examples include those which are based on caprolactam blocked isophoronediisocyanates such as HULS B1530, CARGILL 2400, RUCO NI-2 or those which are based on caprolactam-blocked toluene 2,4-diisocyanate such as commercial CARGILL 2450 crosslinker or the self-blocked uretdione of isophoronediisocyanate commercially available as HULS BF1540.

The most readily-available, and thus the preferred, blocked polyisocyanate cross-linking agents or compounds are those commonly referred to as ε-caprolactam-blocked isophorone diisocyanate, e.g., those described in U.S. Pat. Nos. 3,822,240, 4,150,211 and 4,212,962, incorporated herein by reference. However, the products marketed as ε-caprolactam-blocked isophorone diisocyanate may consist primarily of the blocked, difunctional, monomeric isophorone diisocyanate, i.e., a mixture of the cis and trans isomers of 3-isocyanatomethyl-3,5,5-trimethylcyclohexylisocyanate, the blocked, difunctional dimer thereof, the blocked, trifunctional trimer thereof or a mixture of the monomeric, dimeric and/or trimeric forms. For example, the blocked polyisocyanate compound used as the cross-linking agent may be a mixture consisting primarily of the ε-caprolactam-blocked, difunctional, monomeric isophorone diisocyanate and the ε-caprolactam-blocked, trifunctional trimer of isophorone diisocyanate. The reaction of the isocyanato groups with the blocking compound is reversible at elevated temperatures, e.g., normally about 150° C., and above, at which temperature the isocyanato groups are available to react with the hydroxyl groups present on the free hydroxy groups of the polyester to form urethane linkages.

Alternatively, the blocked isocyanate may be a cross-linking effective amount of an adduct of the 1,3-diazetidine-2,4-dione dimer of isophorone diisocyanate and a diol having the structure

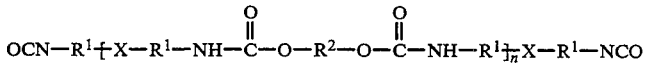

wherein
R$^1$ is a divalent 1-methylene-1,3,3-trimethyl-5-cyclohexyl radical, i.e., a radical having the structure

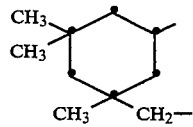

R$^2$ is a divalent aliphatic, cycloaliphatic, araliphatic or aromatic residue of a diol; and X is a 1,3-diazetidine-2,4-dionediyl radical, i.e., a radical having the structure

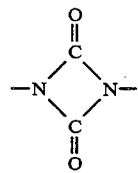

wherein the ratio of NCO to OH groups in the formation of the adduct is about 1:0.5 to 1:0.9, the mole ratio of diazetidinedione to diol is from 2:1 to 6:5, the content of free isocyanate groups in the adduct is not greater than 8 weight percent and the adduct has a molecular weight of about 500 to 4000 and a melting point of about 70° to 130° C.

The adducts of the 1,3-diazetidine-2,4-dione dimer of isophorone diisocyanate and a diol are prepared according to the procedures described in U.S. Pat. No. 4,413,079, incorporated herein by reference, by reacting the diazetidine dimer of isophorone diisocyanate, preferably free of isocyanurate trimers of isophorone diisocyanate, with diols in a ratio of reactants which gives as isocyanto:hydroxyl ratio of about 1:0.5 to 1:0.9, preferably 1:0.6 to 1:0.8.1 The adduct preferably has a molecular weight of 1450 to 2800 and a melting point of about 85° to 120° C. The preferred diol reactant is 1,4-butanediol. Such an adduct is commercially available under the name Hüls BF1540.

Alternatively, the crosslinking agent may be a glycouril type. In general, such crosslinking agents possess a plurality of —N—CH$_2$OR groups with R=C$_1$-C$_8$ alkyl, such as one sold by American Cyanamid as POWDERLINK 1174:

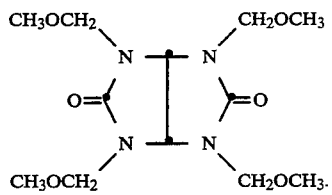

The amount of the cross-linking compound present in the compositions of this invention can be varied depending on several factors such as those mentioned hereinabove relative to the amount of components (a) and (b) which are utilized. Typically, the amount of cross-linking compound which will effectively cross-link the polymers to produce coatings having a good combination of properties is in the range of about 5 to 30 weight percent, preferably 15 to 25 weight percent, based on the total weight of components (a) and (b).

The powder coating compositions of this invention may be prepared from the compositions described herein by dry-mixing and then melt-blending components (a) and (b), and (c), and preferably along with a cross-linking catalyst, e.g., dibutyltin dilaurate along with other additives commonly used in powder coatings, and then grinding the solidified blend to a particle size, e.g., an average particle size in the range of about 10 to 300 microns, suitable for producing powder coatings. For example, the ingredients of the powder coating composition may be dry blended and then melt blended in a Brabender extruder at 90° to 130° C., granulated and finally ground. The melt blending should be carried out at a temperature sufficiently low to prevent the unblocking of the polyisocyanate cross-linking compound and thus avoiding premature cross-linking.

In the above powder coating compositions it may be desirable to utilize in addition, a conventional flow aid, also referred to as flow control or leveling agents, to enhance the surface appearance of cured coatings of the powder coating compositions. Such flow aids typically comprise acrylic polymers and are available from several suppliers, e.g., MODAFLOW from Monsanto Company and ACRONAL from BASF. Other flow control agents which may be used include MODAREZ MFP available from Synthron, EX 486 available from Troy Chemical, BYK 360P available from BYK Mallinkrodt and PERENOL F-30-P available from Henkel. An example of one specific flow aid is an acrylic polymer having a molecular weight of about 17,000 and containing 60 mole percent 2-ethylhexyl methacrylate residues and about 40 mole percent ethyl acrylate residues. The amount of flow aid present may preferably be in the range of about 0.5 to 4.0 weight percent, based on the total weight of the resin component, and the cross-linking agent.

Conventional ultraviolet light stablilizers, such as TINUVIN 234, and hindered amine light stabilizers, such as TINUVIN 144 may also be used. Also, conventional dyes or pigments such as R960 titanium dioxide pigment marketed by Du Pont may be used.

The powder coating compositions may be deposited on various metallic and non-metallic (e.g., thermoplastic or thermoset composite) substrates by known techniques for powder deposition such as by means of a powder gun, by electrostatic deposition or by deposition from a fluidized bed. In fluidized bed sintering, a preheated article is immersed into a suspension of the powder coating in air. The particle size of the powder coating composition normally is in the range of 60 to 300 microns. The powder is maintained in suspension by passing air through a porous bottom of the fluidized bed chamber. The articles to be coated are preheated to about 250° to 400° F. (about 121° to 205° C.) and then brought into contact with the fluidized bed of the powder coating composition. The contact time depends on the thickness of the coating that is to be produced and typically is from 1 to 12 seconds. The temperature of the substrate being coated causes the powder to flow and thus fuse together to form a smooth, uniform, continuous, uncratered coating. The temperature of the preheated article also effects cross-linking of the coating composition and results in the formation of a tough coating having a good combination of properties. Coatings having a thickness between 200 and 500 microns may be produced by this method.

The compositions also may be applied using an electrostatic process wherein a powder coating composition having a particle size of less than 100 microns, preferably about 15 to 50 microns, is blown by means of compressed air into an applicator in which it is charged with a voltage of 30 to 100 kV by high-voltage direct current. The charged particles then are sprayed onto the grounded article to be coated to which the particles adhere due to the electrical charge thereof. The coated article is heated to melt and cure the powder particles. Coatings of 25 to 120 microns thickness may be obtained.

Another method of applying the powder coating compositions is the electrostatic fluidized bed process which is a combination of the two methods described above. For example, annular or partially annular electrodes are mounted in the air feed to a fluidized bed so as to produce an electrostatic charge such as 50 to 100 kV. The article to be coated, either heated, e.g., 250° to 400° F., or cold, is exposed briefly to the fluidized powder. The coated article then can be heated to effect cross-linking if the article was not preheated to a temperature sufficiently high to cure the coating upon contact of the coating particles with the article.

The powder coating compositions of this invention may be used to coat articles of various shapes and sizes constructed of heat-resistance materials such as glass, ceramic and various metal materials. The compositions are especially useful for producing coatings on articles constructed of metals and metal alloys, particularly steel articles. Thus, as a further aspect of the present invention there is provided a shaped or formed article coated with the cured thermosetting powder coating composition of the present invention as illustrated herein.

Further examples of formulation methods, additives, and methods of powder coating application may be found in *User's Guide to Powder Coating*, 2nd Ed., Emery Miller, editor, Society of Manufacturing Engineers, Dearborn, (1987).

EXPERIMENTAL SECTION

Examples

The inherent viscosity (I.V.), in dL/g are determined in phenol/tetrachloroethane (60/40 w/w) at a concentration of 0.5 g/100mL.

The resin melt viscosity, in poise, are determined using an ICI melt viscometer at 200° C.

The acid number and hydroxyl number are determined by titration and reported as mg of KOH consumed for each gram of resin.

The glass transition temperature (Tg), is determined by differential scanning calorimetry (DSC) on the second heating cycle scanning at 20° C./minute after the sample has been heated to melt and quenched to below the resin Tg. Tg values are reported as midpoint.

The weight average molecular weight (Mw) and number average molecular weight (Mn) are determined by gel permeation chromatography in tetrahydrofuran (THF) using polystyrene standard and a UV detector.

Impact strengths are determined using a Gardner Laboratory, Inc., impact tester per ASTM D 2794-84.

Pencil hardness is determined using ASTM D 3363-74. The hardness is reported as the hardest pencil which will not cut into the coating. The results are expressed according to the following scale: (softest) 6B, 5B, 4B, 3B, 2B, B, HB, F, H, 2H, 3H, 4H, 5H, 6H (hardest).

The conical mandrel is performed using a Gardener Laboratory Inc., conical mandrel of specified size according to ASTM-522.

The 20 and 60 degree gloss are measured using a gloss meter (Gardener Laboratory, Inc. Model GC-9095) according to ASTM D-523.

The caking test is performed by placing approximately 100 mls of powder in a 27 mm diameter capped glass jar which is then placed in a 40° C. oven. The powder is examined for loss of free-flowing properties each day.

The QUV resistance is measured by the loss of gloss. QUV is run by alternately exposing the coated panel at 45° C. to a 313 nm fluorescent tube for 8 hours followed by a condensation at 45° C. for 4 hours. Gloss is monitored every 100 hours of exposure. The number of hours needed to reduce the gloss to 50% of the orginal is reported.

The 1,4-CHDA referred to below has a cis/trans ratio of about 60/40. The 1,3-CHDA has a cis/trans ratio of about 30/70.

Resin Examples

1. Resin A (Based on 1,2-cyclohexanedicarboxylic Acid and 2,2,4,4-tetramethyl-1,3-cyclobutanediol)

To a 1000 ml, 3-neck round bottom flask were added 2,2,4,4-tetramethyl-1,3-cyclobutanediol (196.5 g, 0.349 moles), 2,2-dimethyl-1,3-propanediol (36.4 g, 0.349 moles) and trimethylolpropane (4.7 g, 0.035 moles) and FASCAT 4100 catalyst (0.5 g). The contents were heated to a melt at 180° C. 1,2-cyclohexanedicarboxylic anhydride (244.5 g, 1.422 moles), was then added. The flask was swept with 1.0 scfh (standard cubic feet per hour) nitrogen while the temperatures was raised from 180° C. to 230° C. over a 6-hour period. The batch temperature was maintained at 230° C. for 8 hours. The resin had an acid number of 3 mg KOH/g and an ICI melt viscosity of 2 poise at 200° C. 1,2-Cyclohexanedicarboxylic anhydride (47.0 g) is added at 230° C. and the melt is agitated at 230° C. for 4 hours. The molten resin was poured to a syrup can where it cooled to a solid with the following properties:

| I.V. | dl/g |
|---|---|
| ICI Melt Viscosity at 200° C. | poise |
| Acid Number | 39 |
| Hydroxyl number | 12 |
| DSC (2nd cycle) | |
| Tg | 48° |

2. Resin B (Based on 1,3-cyclohexanedicarboxylic Acid and 2,2,4,4-tetramethyl-1,3-cyclobutanediol)

To a 1000 ml, 3-neck round bottom flask were added 2,2,4,4-tetramethyl-1,3-cyclobutanediol (189.9 g, 1.317 moles), 2,2-dimethyl-1,3-propanediol (42.1 g, 0.404 moles) and trimethylolpropane (4.7 g, 0.035 moles) and FASCAT 4100 catalyst (0.5 g). The contents were heated to melt at 180° C. and 1,3-cyclohexanedicarboxylic acid (269.2 g, 1.565 moles) was added. The flask was swept with 1.0 scfh nitrogen while the temperatures was raised from 180° C. to 230° over a 6-hour period. The batch temperature was maintained at 230° C. for 8 hours. 1,3-Cyclohexanedicarboxylic acid (53.0 g) was added at 230° C. and the melt agitated at 230° C. for 4 hours. The molten resin was poured to a syrup can where it cooled to a solid with the following properties:

| I.V. | 0.237 dl/g |
|---|---|
| ICI Melt Viscosity at 200° C. | 4 poise |
| Acid Number | 42 |

3. Resin C (Based on 1,4-cyclohexanedicarboxylic Acid and 2,2,4,4-tetramethyl-1,3-cyclobutanediol)

To a 1000 ml, 3-neck round bottom flask were added 2,2,4,4-tetramethyl-1,3-cyclobutanediol (244.9 g, 1.698 moles), trimethylolpropane (4.7 g, 0.035 moles), adipic acid (54.9 g, 0.375 moles) and FASCAT 4100 catalyst (0.5 g). The contents were heated to melt at 180° C. and 1,4-cyclohexanedicarboxylic acid (200.6 g, 1.166 moles) was added. The flask was swept with 1.0 scfh nitrogen while the temperatures was raised from 180° C. to 230° C. over a 6-hour period. The batch temperature was maintained at 230° C. for 8 hours. 1,4-Cyclohexanedicarboxylic acid (53.0 g) was added at 230° C. and the melt agitated at 230° C. for 4 hours. The molten resin was poured to a syrup can where it cooled to a solid with the following properties:

| I.V. | 0.175 dl/g |
|---|---|
| ICI Melt Viscosity at 200° C. | 12 poise |
| Acid Number | 51 |
| DSC (2nd cycle) | |
| Tg | 53° C. |
| Gel permeation chromatography | |
| Mw | 15314 |
| Mn | 12107 |

4. Resin D (Based on 1,4-cyclohexanedicarboxylic Acid and 2,2,4,4-tetramethyl-1,3-cyclobutanediol)

To a 1000 ml, 3-neck round bottom flask were added 2,2,4,4-tetramethyl-1,3-cyclobutanediol (269.9 g, 1.569 moles), 1,6-hexanediol (40.9 g, 0,346 moles), trimethylolpropane (4.6 g, 0,035 moles) and FASCAT 4100 catalyst (0.5 g). The contents were heated to melt at 180° C. and 1,4-cyclohexanedicarboxylic acid (269.9 g, 1.569 moles) was added. The flask was swept with 1.0 scfh nitrogen while the temperatures was raised from 180° C. to 230° C. over a 6-hour period. The batch temperature was maintained at 230° C. for 8 hours. 1,4-Cyclohexanedicarboxylic acid (53.0 g) was added at 230° C. and the melt agitated at 230° C. for 4 hours. The molten resin was poured to a syrup can where it cooled to a solid with the following properties:

| I.V. | 0.237 dl/g |
|---|---|
| ICI Melt Viscosity at 200° C. | 32 poise |
| Acid Number | 36 mg |
| DSC (2nd cycle) | |
| Tg | 52° C. |
| Gel permeation chromatography | |
| Mw | 24193 |
| Mn | 19309 |

5. Resin E (Based on 1,4-cyclohexanedicarboxylic Acid and 2,2,4,4-tetramethyl-1,3-cyclobutanediol)

To a 1000 ml, 3-neck round bottom flask were added 2,2,4,4-tetramethyl-1,3-cyclobutanediol (156.6 g, 1.0859 moles), 2,2-dimethyl-1,3-propanediol (66.0 g, 0.6331 moles) and trimethylolpropane (12.1 g, 0.0906 moles) and FASCAT 4100 catalyst (0.5 g). The contents were heated to melt at 180° C. and 1,4-cyclohexanedicarboxylic acid (266.8 g, 1.5512 moles), 0.66 moles) was added. The flask was swept with 1.0 scfh nitrogen while the temperatures was raised from 180° C. to 230° C. over a 6-hour period. The batch temperature was maintained at 230° C. for 8 hours. The resin had an acid number of 0.5 mg KOH/g and an ICI melt viscosity of 30 poise at 200° C. 1,4-Cyclohexanedicarboxylic acid (70.0 g) was added at 230° C. and the melt agitated at 230° C. for 4 hours. The molten resin was poured to a syrup can where it cooled to a solid with the following properties:

| I.V. | 0.255 dl/g |
|---|---|
| ICI Melt Viscosity at 200° C. | 40 poise |
| Acid Number | 43 |
| Hydroxyl Number | 3 |
| DSC (2nd cycle) | |
| Tg | 52° C. |
| Gel permeation chromatography | |
| Mw | 13,146 |
| Mn | 4,236 |

Powder Examples

1A. Example: Powder Coating from Resin A and Beta-hydroxylalkylamide

Resin A (372.0 g), PRIMID XL552 cross-linker (28.0 g), MODAFLOW III flow aid (6.0 g), benzoin (1.0 g), TINUVIN 144 (6.0 g), TINUVIN 234 (6.0 g), and titanium dioxide (200.0 g) are mixed in a Vitamix mixer and compounded in an APV extruder at 130° C. The extrudate was cooled, granulated, and pulverized in a Bantam mill with liquid nitrogen bled into the grinding chamber. The powder was classified through a 200 mesh screen. The powder was electro-statically applied to a 3 in.×9 in. metal panel and cured in a 350° F. oven for 20 minutes. The film properties are as follows:

| Film thickness, Mil | 1.7 |
|---|---|
| Impact strength, (in.-lb) | |
| Front | 60 |
| Reverse | 20 |
| Pencil Hardness | F |
| Gloss | |
| 20 deg | 30 |
| 60 deg | 77 |
| MEK double rubs | 180 |
| QUV, hours to 50% loss | 5000 |

2A. Comparative Example: Powder Coating from Resin B and Beta-hydroxylalkylamide Resin B (372.0 g), PRIMID XL552 crosslinker (28.0 g), MODAFLOW III flow aid (6.0 g), benzoin (1.0 g), TINUVIN 144 (6.0 g), TINUVIN 234 (6.0 g), and titanium dioxide (200.0 g) are mixed in a Vitamix mixer and compounded in an APV extruder at 130° C. The extrudate was cooled, granulated, and pulverized in a Bantam mill with liquid nitrogen bled into the grinding chamber. The powder was classified through a 200 mesh screen. The powder is electrostatically applied to a 3 in.×9 in. metal panel and cured in a 350° F. oven for 20 minutes. The film properties are as follows:

| Film thickness, Mil | 1.9 |
|---|---|
| Impact strength, (in.-lb) | |
| Front | 60 |
| Reverse | 20 |
| Pencil Hardness | F |
| Gloss | |
| 20 deg | 55 |
| 60 deg | 84 |
| MEK double rubs | 200 |
| QUV, hours to 50% loss | 1500 |

3A. Comparative Example: Powder Coating from Resin C and Beta-hydroxylalkylamide Resin C (372.0 g), PRIMID XL552 (28.0 g), MODAFLOW III (6.0 g), benzoin (1.0 g), TINUVIN 144 (6.0 g), TINUVIN 234 (6.0 g), and titanium dioxide (200.0 g) were mixed in a Vitamix mixer and compounded in an APV extruder at 130° C. The extrudate was cooled, granulated, and pulverized in a Bantam mill with liquid nitrogen bled into the grinding chamber. The powder was classified through a 200 mesh screen. The powder was electrostatically applied to a 3 in.×9 in. metal panel and cured in a 350° F. oven for 20 minutes. The film properties are as follows:

| Film thickness, Mil | 3.0 |
|---|---|
| Impact strength, (in.-lb) | |
| Front | 20 |
| Reverse | 20 |
| Pencil Hardness | Hb |
| Gloss | |
| 20 deg | 47 |
| 60 deg | 83 |
| MEK double rubs | 200 |
| QUV, hours to 50% loss | 3350 |

4A. Comparative Example: Powder Coating from Resin D and Beta-hydroxylalkylamide Resin D (372.0 g), PRIMID XL552 cross-linker (28.0 g), MODAFLOW III flow aid (6.0 g), benzoin (1.0 g), TINUVIN 144 (6.0 g), TINUVIN 234 (6.0 g), and titanium dioxide (200.0 g) were mixed in a Vitamix mixer and compounded in an APV extruder at 130° C. The extrudate was cooled, granulated, and pulverized in a Bantam mill with liquid nitrogen bled into the grinding chamber. The powder was classified through a 200 mesh screen. The powder was electrostatically applied to a 3 in.×9 in. metal panel and cured in a 350° F. oven for minutes. The film properties were as follows:

| Film thickness, Mil | 2.4 |
|---|---|
| Impact strength, (in.-lb) | |
| Front | 60 |
| Reverse | 80 |
| Pencil Hardness | Hb |
| Gloss | |
| 20 deg | 62 |
| 60 deg | 86 |
| MEK double rubs | 200 |
| QUV, hours to 50% loss | 3200 |

5A. Comparative Example: Powder Coating from Resin E and Beta-hydroxylalkylamide Resin E (372 g), PRIMID XL552 (28.0 g), MODAFLOW 2000 (4.0 g), benzoin (1.0 g), TINUVIN 144 (6.0 g), TINUVIN 234 (6.0 g), and titanium dioxide (200.0 g) were mixed in a Vitamix mixer and compounded in an APV extruder at 130° C. The extrudate was cooled, granulated, and pulverized in a Bantam mill with liquid nitrogen bled into the grinding chamber. The powder was classified through a 200 mesh screen. The powder was electrostatically applied to a 3 in.×9 in. metal panel and cured in a 325° F. oven for 20 minutes. The film properties are as follows:

| Film thickness, Mil | 2.2 |
|---|---|
| Impact strength, (in.-lb) | |
| Front | 40 |
| Reverse | 20 |
| Pencil Hardness | H |
| Gloss | |
| 20 deg | 68 |
| 60 deg | 89 |
| MEK double rubs | 200 |
| QUV, hours to 50% loss | 2200 hrs |

6A. Comparative; Powder Coatings from hydroxyl RUCOTE 107 Polyester and ε-caprolactam blocked isophoronediisocyanate RUCOTE 107 polyester (800 g), HULS 1530 cross-linker (200.0 g), benzoin (10.0 g), MODAFLOW III flow aid (10.0 g), TINUVIN 144 (14.3 g), TINUVIN 234 (14.3 g), and titanium dioxide (400.0 g) were mixed in a Henschel mixer and compounded in an ZSK 30 extruder. The extruder temperature profile is Feed zone=110° C., die zone=125° C. and a screw speed of 250 rpm with feeding rate enough to maitain 45% torque. The extrudate was cooled through a chill roll, granulated and pulverized using a Bantam mill with liquid nitrogen bled into the grinding chamber. The powder was classified through a 200 mesh screen, electrostatically applied to 3 in.×9 in. metal panels and cured in a 350 F. oven for 20 minutes. The film properties are as follows:

| Film thickness, Mil | 2.0 |
|---|---|
| Impact strength, (in.-lb) | |
| Front | 160 |
| Reverse | 160 |
| Pencil Hardness | H |
| Gloss | |
| 20 deg | 84 |
| 60 deg | 95 |
| MEK double rubs | 200 |
| QUV, hours to 50% loss of gloss | 240 |

7A. Comparative; Powder Coating from Carboxyl RUCOTE 915 Polyester and PRIMID XL552 Cross-linker Carboxyl RUCOTE 915 polyester (379.0 g), PRIMID XL552 cross-linker (21.0 g), MODAFLOW III flow aid (4.0 g), benzoin (1.0 g), TINUVIN 144 (6.0 g), TINUVIN 234 (6.0 g), and titanium dioxide (200.0 g) are mixed in a Vitamix mixer and compounded in an APV extruder at 130° C. The extrudate was cooled, granulated, and pulverized in a Bantam mill with liquid nitrogen bled into the grinding chamber. The powder was classified through a 200 mesh screen. The powder was electrostatically applied to a 3 in.×9 in. metal panel and cured in a 325° F. oven for 20 minutes. The film properties are as follows:

| Film thickness, Mil | 2.0 |
|---|---|
| Impact strength, (in.-lb) | |
| Front | 40 |
| Reverse | 80 |
| Pencil Hardness | F |
| Gloss | |
| 20 deg | 78 |
| 60 deg | 95 |
| MEK double rubs | 200 |
| QUV, hours to 50% loss | 230 |

8A. Comparative; Powder Coating from Carboxyl EMS GRILESTA 7612 Polyester and PRIMID XL552 Cross-linker Carboxyl EMS GRILESTA 7612 polyester (379.0 g), PRIMID XL552 cross-linker (21.0 g), MODAFLOW III cross-linker (4.0 g), benzoin (1.0 g), TINUVIN 144 (6.0 g), TINUVIN 234 (6.0 g), and titanium dioxide (200.0 g) were mixed in a Vitamix mixer and compounded in an APV extruder at 130° C. The extrudate was cooled, granulated, and pulverized in a Bantam mill with liquid nitrogen bled into the grinding chamber. The powder was classified through a 200 mesh screen. The powder was electrostatically applied to a 3 in.×9 in. metal panel and cured in a 350° F. oven for 20 minutes. The film properties are as follows:

| Film thickness, Mil | 21.1 |
|---|---|
| Impact strength, (in.-lb) | |
| Front | 160 |
| Reverse | 160 |
| Pencil Hardness | H |
| Gloss | |
| 20 deg | 73 |
| 60 deg | 92 |
| MEK double rubs | 200 |
| QUV, hours to 50% loss | 250 |

9A. Comparative; Powder Coatings from Carboxyl EMS GRILESTA 7309 Polyester triglycidylisocyanurate Carboxyl EMS GRILESTA 7309 polyester (372.0 g), triglycidylisocyanurate (28.0 g), MODAFLOW III flow aid (4.0 g), benzoin (1.0 g), TINUVIN 144 (5.6 g), TINUVIN 234 (5.6 g), and titanium dioxide (160.0 g) were mixed in a Vitamix mixer and compounded in an APV extruder at 130° C. The extrudate was cooled, granulated, and pulverized in a Bantam mill with liquid nitrogen bled into the grinding chamber. The powder was classified through a 200 mesh screen. The powder was electro-statically applied to a 3 in.×9 in. metal panel and cured. in a 350° F. oven for 20 minutes. The film properties are as follows:

| Film thickness, Mil | 1.9 |
|---|---|
| Impact strength, (in.-lb) | |
| Front | 160 |
| Reverse | 160 |
| Pencil Hardness | H |
| Gloss | |
| 20 deg | 63 |
| 60 deg | 82 |
| MEK double rubs | 200 |
| QUV, hours to 50% loss | 250 |

We claim:

1. A thermosetting powder coating composition which comprises,
   (a) a polyester comprised of from about 80 to 100 weight percent of residues of 1,2-cyclohexanedicarboxylic acid and from about 80 to 100 weight percent of residues of 2,2,4,4-tetramethyl-1,3-cyclobutanediol, and having a number average molecular weight of about 1500 to 10,000, and a glass transition temperature of about 45° C. to 100° C.; and
   (b) a cross-linking agent reactive with said polyester wherein said composition, after application to a substrate and curing, provides a coating which possesses a QUV resistance of at least 5000 hours, said resistance determined by the number of hours required to reduce the original gloss of said coating by 50%, wherein said coating is alternately exposed to an illuminated 313 nm fluorescent tube at 45° C. for an 8 hour period followed by a 4 hour period of darkness at 45° C.

2. The composition of claim 1, wherein the polyester has a carboxyl number of from about 20 to about 100, and a hydroxyl number of less than about 15.

3. The composition of claim 1, wherein the polyester has a hydroxyl number of from about 20 to about 100, and a carboxyl number of less than about 15.

4. The composition of claim 2, wherein the cross-linking agent is an epoxy cross-linker.

5. The composition of claim 4, wherein the cross-linking agent is triglycidylisocyanurate.

6. The composition of claim 2, wherein the cross-linking agent is a β-hydroxyialkyl amide.

7. The composition of claim 6, wherein the cross-linker is Bis(N,N-dihydroxyethyl)adipamide.

8. The composition of claim 3, wherein the cross-linking agent is a blocked polyisocyanate.

9. A thermosetting powder coating composition which comprises,
   (a) a polyester which consists essentially of residues of 1,2-cyclohexanedicarboxylic acid, 2,2,4,4-tetramethyl-1,3-cyclobutanediol, and up to 10 weight percent of a trifunctional monomer residue selected from residues of the group consisting of trimethylolethane, trimethylolpropane, glycerol, and trimellitic anhydride, and having a number average molecular weight of about 1500 to 10,000, and a glass transition temperature of about 45° C. to 100° C.; and
   (b) a cross-linking agent reactive with said polyester wherein said composition, after application to a substrate and curing, provides a coating which possesses a QUV resistance of at least 5000 hours, said resistance determined by the number of hours required to reduce the original gloss of said coating by 50%, wherein said coating is alternately exposed to an illuminated 313 nm fluorescent tube at 45° C. for an 8 hour period followed by a 4 hour period of darkness at 45° C.

10. The composition of claim 9, wherein the polyester has a carboxyl number of from about 20 to about 100, and a hydroxyl number of less than about 15.

11. The composition of claim 9, wherein the polyester has a hydroxyl number of from about 20 to about 100, and a carboxyl number of less than about 15.

12. The composition of claim 10, wherein the cross-linking agent is an epoxy cross-linker.

13. The composition of claim 12, wherein the cross-linking agent is triglycidylisocyanurate.

14. The composition of claim 10, wherein the cross-linker is Bis(N,N-dihydroxyethyl)adipamide.

15. A shaped or formed article coated with the cured composition of claim 2.

16. A shaped or formed article coated with the cured composition of claim 3.

17. A shaped or formed article coated with the cured composition of claim 9.

18. A polyester comprised of from about 80 to 100 weight percent of residues of 1,2-cyclohexanedicarboxylic acid and from about 80 to 100 weight percent of residues of 2,2,4,4-tetra-methyl-1,3cyclobutanediol, and having a number average molecular weight of about 1500 to 10,000, and a glass transition temperature of about 45° C. to 100° C.

19. A polyester which consists essentially of residues of 1,2-cyclohexanedicarboxylic acid, 2,2,4,4-tetramethyl-1,3-cyclobutanediol, and up to 10 weight percent of a trifunctional monomer residue selected from residues of the group consisting of trimethylolethane, trimethylolpropane, glycerol, and trimellitic anhydride, and having a number average molecular weight of about 1500 to 10,000, and a glass transition temperature of about 45° C. to 100° C.

20. The polyester of claim 19, wherein the trifunctional monomer is trimethylolpropane.

21. The polyester of claim 19, wherein the number average molecular weight is 2,000 to 6,000, the glass transition temperature (Tg) is about 50° to 70° C., and the trifunctional monomer is trimethylolpropane.

* * * * *